(12) United States Patent
Shin et al.

(10) Patent No.: US 9,344,855 B2
(45) Date of Patent: May 17, 2016

(54) INDOOR WIRELESS POSITIONING SYSTEM AND INDOOR WIRELESS POSITIONING METHOD

(71) Applicant: Foundation of Soongsil University-Industry Cooperation, Seoul (KR)

(72) Inventors: Yoan Shin, Seoul (KR); Xiao Fan, Seoul (KR); Jian Shi, Seoul (KR); Kwangyul Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 14/273,642

(22) Filed: May 9, 2014

(65) Prior Publication Data

US 2015/0172873 A1 Jun. 18, 2015

(30) Foreign Application Priority Data

Dec. 18, 2013 (KR) .......................... 10-2013-0158278
Dec. 27, 2013 (KR) .......................... 10-2013-0164836

(51) Int. Cl.
*H04W 24/00* (2009.01)
*H04M 11/04* (2006.01)
*H04W 4/04* (2009.01)

(52) U.S. Cl.
CPC ..................................... *H04W 4/043* (2013.01)

(58) Field of Classification Search
CPC ..... G01S 5/0252; H04W 16/20; H04W 64/00
USPC .................... 455/456.1, 404.2, 457
See application file for complete search history.

(56) References Cited

U.S. PATENT DOCUMENTS

| | | | | |
|---|---|---|---|---|
| 2005/0195102 | A1* | 9/2005 | Vaman | G01S 5/0294 342/90 |
| 2005/0272472 | A1* | 12/2005 | Goldberg et al. | 455/562.1 |
| 2008/0026770 | A1* | 1/2008 | Rudravaram | G01S 5/0289 455/456.1 |
| 2010/0245076 | A1* | 9/2010 | Jo | G01S 5/14 340/539.1 |
| 2012/0007779 | A1* | 1/2012 | Klepal et al. | 342/451 |

(Continued)

FOREIGN PATENT DOCUMENTS

| | | |
|---|---|---|
| KR | 10-2008-0053116 A | 6/2008 |
| KR | 10-2009-0043733 A | 5/2009 |
| KR | 10-2009-0089044 A | 8/2009 |
| KR | 10-2011-0116564 A | 10/2011 |

(Continued)

*Primary Examiner* — Thomas Lett
(74) *Attorney, Agent, or Firm* — Novick, Kim & Lee, PLLC; Sang Ho Lee

(57) ABSTRACT

Provided are an indoor wireless positioning system and method capable of more accurately performing indoor wireless positioning by predicting signal attenuation due to a floor or wall within a multi-floor building. The indoor wireless positioning method includes calculating floor loss information of a floor on which the user terminal is located within the building, a higher floor, and a lower floor, calculating the floor on which the user terminal is located by comparing the calculated floor loss information to pre-stored previous floor loss information, calculating information about wall loss in the floor on which the user terminal is located, and acquiring position information on a horizontal plane of the user terminal according to received signal strength of the user terminal and the information about the wall loss. When the position of the user terminal is detected, detection accuracy is improved and more efficient wireless positioning is possible.

11 Claims, 7 Drawing Sheets

(56) References Cited

U.S. PATENT DOCUMENTS

2013/0260782 A1* 10/2013 Un .................... H04W 64/00 455/456.1
2014/0163864 A1* 6/2014 Beermann ............ G01C 21/206 701/409

FOREIGN PATENT DOCUMENTS

| KR | 10-2011-0116565 A | 10/2011 |
| KR | 10-2012-0034192 A | 4/2012 |
| KR | 10-2012-0049600 A | 5/2012 |

* cited by examiner

INDOOR WIRELESS POSITIONING SYSTEM AND INDOOR WIRELESS POSITIONING METHOD

CROSS REFERENCE TO PRIOR APPLICATIONS

The present application claims priority under 35 U.S.C. §119 to Korean Patent Application Nos. 10-2013-0158278 (filed on Dec. 18, 2013) and 10-2013-0164836 (filed on Dec. 27, 2013), which are hereby incorporated by reference in their entirety.

BACKGROUND OF THE INVENTION

1. Field of the Invention

The present invention relates to an indoor wireless positioning system and an indoor wireless positioning method capable of calculating a position of a user terminal which moves inside a building.

2. Description of Related Art

Recently, researches on wireless local area network (LAN)-based indoor positioning has been conducted in many countries such as the United States and Europe. For example, the Place Lap project which is being conducted by Intel Corporation may basically measure a position based on a wireless LAN signal value. In addition, a method of estimating a more accurate position by constructing the newest network infrastructure such as Global System for Mobile Communications (GSM), or Bluetooth, radio frequency identification (RFID) is being further studied.

For example, an indoor positioning method using a MOTE sensor network which is a modification of the wireless LAN network when a home service, indoor guidance, etc, are provided is being studied in the ASK-IT project for mobility impaired Europeans.

In addition, there are a radio signal propagation model, a RAdio Detection And Ranging (RADAR) system using a nearest neighbor technique of selecting a position closest to a calculated point, etc. In addition, there are Ekahau's real-time location system, an AeroScout visibility system, etc. as systems which are being commercialized and sold.

In these researches, a plurality of specific positioning methods have been proposed and the proposed positioning methods may broadly be summarized as two methods. One method is a triangulation method used in a global positioning system (GPS) and the other method is a fingerprinting method of dividing a region in the form of a grid as in a cellular network and measuring a position in units of cells.

Although the strength of a signal received from a sensor (or node) is generally utilized to estimate a position of the sensor (or node) in a radio sensor network, there is a disadvantage in that received signal strength (RSS) is sensitively varied by indoor obstacles such as a wall, a floor, and a person.

SUMMARY OF THE INVENTION

An aspect of the present invention provides an indoor wireless positioning system and an indoor wireless positioning method capable of more accurately performing indoor wireless positioning by predicting signal attenuation due to a floor or wall within a multi-floor building.

According to an embodiment of the present invention, there is provided an indoor wireless positioning method of tracking a position of a user terminal which moves inside a building including a plurality of floors, the indoor wireless positioning method including: calculating floor loss information of a floor on which the user terminal is located within the building, a higher floor, and a lower floor; calculating the floor on which the user terminal is located by comparing the calculated floor loss information to pre-stored previous floor loss information; and calculating information about wall loss in the floor on which the user terminal is located and acquiring position information on a horizontal plane of the user terminal according to RSS of the user terminal and the information about the wall loss.

Calculating the floor loss information of the floor on which the user terminal is located within the building, the higher floor, and the lower floor may include: calculating the floor loss information of the higher floor and the lower floor according to RSSs transmitted from the higher floor and the lower floor in relation to the floor on which the user terminal is located within the building, power loss at a reference distance, and power loss in the floor on which the user terminal is located.

Calculating the floor on which the user terminal is located by comparing the calculated floor loss information to the pre-stored previous floor loss information may include: calculating a Euclidean distance value by comparing the calculated floor loss information to a plurality of pieces of pre-stored previous floor loss information within the building; and calculating the floor on which the user terminal is located by finding a minimum Euclidean distance value.

Acquiring the position information on the horizontal plane of the user terminal according to the RSS of the user terminal and the information about the wall loss may include: calculating the position of the user terminal in a free space without a wall by calculating an attenuation value of the RSS transmitted to the user terminal and subtracting an attenuation value due to the wall loss from the attenuation value of the RSS.

Distances from a plurality of access points (APs) transmitting signals to the user terminal in the free space without the wall may be calculated, and position coordinates of the user terminal may be calculated using a triangulation technique for the calculated distances.

According to another embodiment of the present invention, there is provided an indoor wireless positioning system for tracking a position of a user terminal which moves inside a building including a plurality of floors, the indoor wireless positioning system including: at least one AP installed for each floor and configured to transmit a signal within the building; a database configured to store previous floor attenuation information related to loss when the signal passes through each floor when the signal is transmitted within the building; and an indoor wireless positioning apparatus configured to calculate floor loss information of a floor on which the user terminal is located within the building, a higher floor, and a lower floor, calculate the floor on which the user terminal is located according to the calculated floor loss information and the previous floor loss information, calculate information about wall loss in the floor on which the user terminal is located, and acquire position information on a horizontal plane of the user terminal according to RSS of the user terminal and the information about the wall loss.

The AP may be installed in each floor within the building, at least one vertical group in which APs installed in each floor within the building are installed on the same vertical plane may be present, and at least one horizontal group in which APs have the same horizontal coordinates for each floor may be present.

The indoor wireless positioning apparatus may calculate the floor loss information of the higher floor and the lower floor according to RSSs transmitted from the higher floor and the lower floor in relation to the floor on which the user terminal is located, power loss at a reference distance, and power loss in the floor on which the user terminal is located.

A process in which the indoor wireless positioning apparatus calculates the floor on which the user terminal is located by comparing the calculated floor loss information to the pre-stored previous floor loss information may be a process of calculating a Euclidean distance value by comparing the calculated floor loss information to a plurality of pieces of pre-stored previous floor loss information within the building and calculating the floor on which the user terminal is located by finding a minimum Euclidean distance value.

A process in which the indoor wireless positioning apparatus acquires the position information on the horizontal plane of the user terminal according to the RSS of the user terminal and the information about the wall loss may be a process of calculating the position of the user terminal in a free space without a wall by calculating an attenuation value of the RSS transmitted to the user terminal, and subtracting an attenuation value due to the wall loss from the attenuation value of the RSS.

DETAILED DESCRIPTION OF THE INVENTION

Figure 1:
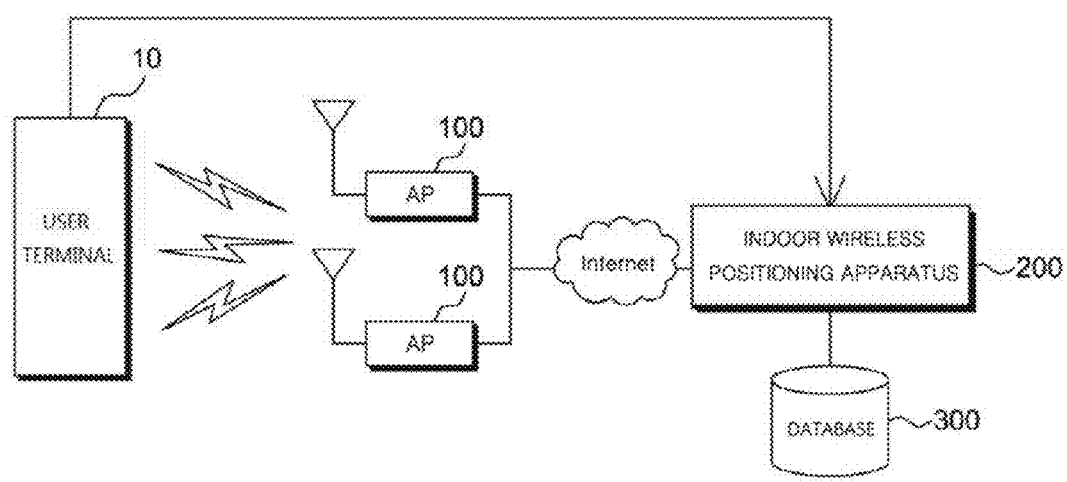
FIG. 1 is a conceptual diagram illustrating an indoor wireless positioning system according to an embodiment of the present invention.

Hereinafter, preferred embodiments of the present invention will be described in detail with reference to the accompanying drawing. In the entire description of the present invention, the same drawing reference numerals are used for the same elements across various figures.

FIG. 1 is a conceptual diagram illustrating an indoor wireless positioning system according to an embodiment of the present invention.

The indoor wireless positioning system may include a user terminal 10, a plurality of APs 100 installed indoors, an indoor wireless positioning apparatus 200, and a database 300.

The user terminal 10 serves as a terminal equipped with a wireless LAN apparatus and can communicate with the AP 100 when the user terminal 10 is located within a coverage region of a wireless network.

The AP 100 may be installed at a plurality of points so that the coverage region of the wireless network can be set.

The indoor wireless positioning apparatus 200 may measure a position of the user terminal 10 located within the coverage region of the wireless network. The indoor wireless positioning apparatus 200 may measure the position of the user terminal 10 according to floor attenuation prediction and wall attenuation prediction.

The indoor wireless positioning apparatus 200 may measure the position of the user terminal 10 using a signal propagation model. The signal propagation model will be described through Equations (1) to (3).

$$P_r = P_t - P_L \quad (1)$$

$P_r$=Reception power
$P_t$=Transmission power
$P_L$=Path power loss

The reception power $P_r$ of the user terminal 10 is the same as a value obtained by subtracting the path power loss $P_L$ from the transmission power of an AP. $P_L(d)$ may be represented as a function of a distance d as shown in the following Equation (2) when floor attenuation is considered as power loss according to the distance.

$$P_L(d) = PL(d_0) + 10 \cdot u \cdot \log(d/d_0) + FA \quad (2)$$

$PL(d_0)$=Power loss at a reference distance $d_0$ (for example, 1 m)
u=Path loss exponent
d=Distance from the AP
FA=Floor attenuation The following Equation (3) is derived in consideration of wall attenuation based on the above-described Equation (2).

$$P_L(d) = PL(d_0) + 10 \cdot u \cdot \log(d/d_0) + FA + nWA \quad (3)$$

$PL(d_0)$=Power loss at the reference distance $d_0$ (for example, 1 m)
u=Path loss exponent
d=Distance from the AP
FA=Floor loss
WA=Wall loss
n=Number of walls The database 300 may pre-store a previous floor attenuation amount (FA) and a previous wall attenuation amount (WA). The floor attenuation amount and the wall attenuation amount are values obtained by digitizing degrees to which a signal is attenuated according to materials (wood, cement, etc.) of a floor and a wall.

Figure 2A:
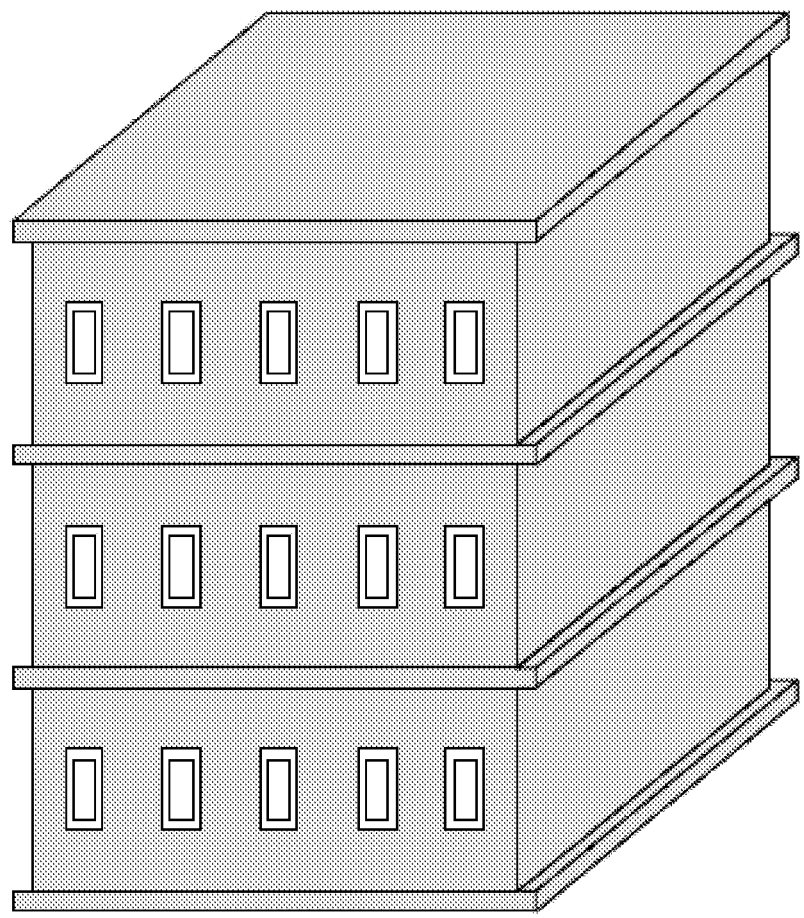
FIG. 2A is a diagram of an example of a building in which the indoor wireless positioning system according to the embodiment of the present invention measures a position of a user terminal.
Figure 2B:
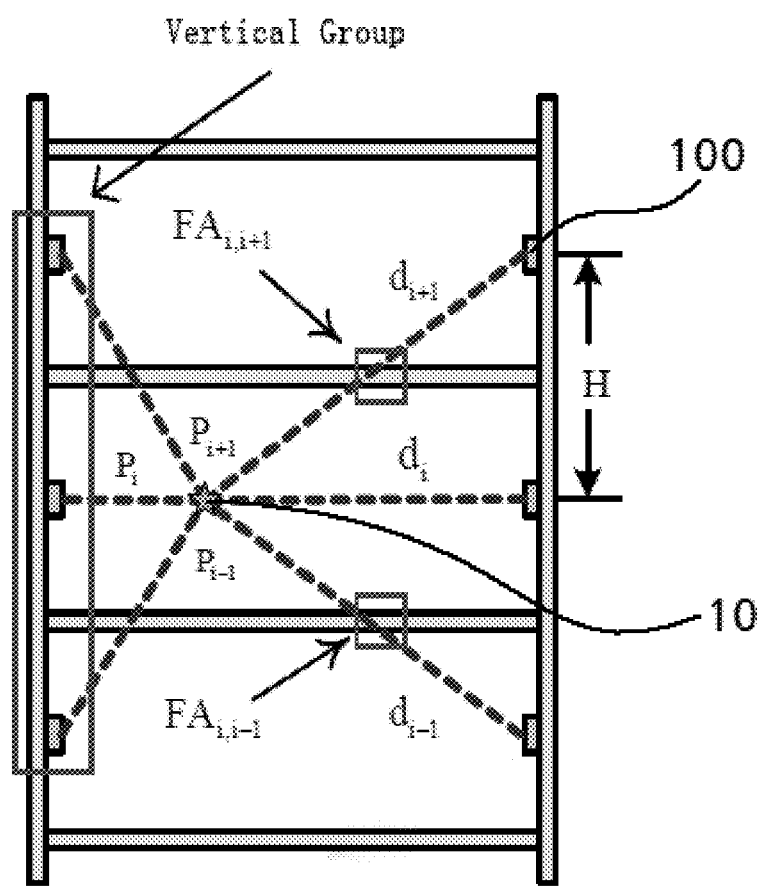
FIG. 2B is a cross-sectional view of the building of FIG. 2A.

FIG. 2A is a diagram of an example of a building in which the indoor wireless positioning system according to the embodiment of the present invention measures a position of a user terminal, and FIG. 2B is a cross-sectional view of the building of FIG. 2A.

The illustrated building includes three floors, and the user terminal 10 is located inside the building. In addition, the AP 100 is provided on each floor and transmits a signal.

The user terminal 10 may receive a signal transmitted from the AP 100 located on each floor of the building. The strength of the signal received by the user terminal 10 is reduced while undergoing floor or wall attenuation. Here, the floor attenuation represents a lost signal magnitude when the signal passes through the floor and the wall attenuation represents a lost signal magnitude when the signal passes through the wall.

The indoor wireless positioning apparatus 200 may estimate a position of a floor and a position on a horizontal plane according to RSS of the user terminal 10. The indoor wireless positioning apparatus 200 may identify a floor number of the user terminal 10 and its position on the horizontal plane in the floor number identification step and the horizontal plane position identification step.

The indoor wireless positioning apparatus 200 may extract floor attenuation using the following Equations (4) to (9) in the floor number identification step, obtain a Euclidean distance value by comparing the extracted floor attenuation to pre-stored previous floor attenuation, and identify a floor number in which the user terminal 10 is located according to the Euclidean distance value. Hereinafter, this, for example, will be specifically described using the following equations.

$$d_i = 10^{\frac{PL_i - PL(d_0)}{10u}} \qquad (4)$$

$d_i$=Distance between an AP located on an $i^{th}$ floor and a user terminal
$PL_i$=Power loss in the $i^{th}$ floor
$PL(d_0)$=Power loss at the reference distance $d_0$ (for example, 1 m)
$u$=Path loss exponent $$d_{i+1} = 10^{\frac{PL_{i+1} - FA_{i+1} - PL(d_0)}{10u}} \qquad (5)$$

$d_{i+1}$=Distance between an AP located on an $(i+1)^{th}$ floor and a user terminal located on the $i^{th}$ floor
$PL_{i+1}$=Power loss in the $(i+1)^{th}$ floor
$FA_{i+1}$=Floor loss in the $(i+1)^{th}$ floor
$PL(d_0)$=Power loss at reference distance $d_0$ (for example, 1 m)
$u$=Path loss exponent $$d_{i-1} = 10^{\frac{PL_{i-1} - FA_{i-1} - PL(d_0)}{10u}} \qquad (6)$$

$d_{i-1}$=Distance between an AP located on an $(i-1)^{th}$ floor and a user terminal located on the $i^{th}$ floor
$PL_{i-1}$=Power loss in the $(i-1)^{th}$ floor
$FA_{i-1}$=Floor loss in the $(i-1)^{th}$ floor
$PL(d_0)$=Power loss at reference distance $d_0$ (for example, 1 m)
$u$=Path loss exponent Equation (4) represents the distance between the AP located on the $i^{th}$ floor and the user terminal, Equation (5) represents the distance between the AP located on the $(i+1)^{th}$ floor and the user terminal located on the $i^{th}$ floor, and Equation (6) represents the distance between the AP located on the $(i-1)^{th}$ floor and the user terminal located on the $i^{th}$ floor.

$$H^2 + d_i^2 = d_{i+1}^2 = d_{i-1}^2 \qquad (7)$$

A formula like Equation (7) is derived using the Pythagoras theorem based on FIG. 2B. Equation (8) is derived when Equations (4) and (5) are substituted into Equation (7), and Equation (9) is derived when Equations (4) and (6) are substituted into Equation (7).

$$FA_{i,i+1} = P_{i+1} - PL(d_0) - 5u\log_{10}\left(H^2 + 10^{\frac{PL_i - PL(d_0)}{5u}}\right) \qquad (8)$$

$FA_{i,i+1}$=Floor loss between the $i^{th}$ floor and the $(i+1)^{th}$ floor
$P_{i+1}$=Strength of a signal transmitted from the $(i+1)^{th}$ floor to the user terminal
$PL(d_0)$=Power loss at the reference distance $d_0$ (for example, 1 m)
$u$=Path loss exponent
$H$=Vertical distance between APs installed in each floor
$PL_i$=Power loss in the $i^{th}$ floor $$FA_{i,i-1} = P_{i-1} - PL(d_0) - 5u\log_{10}\left(H^2 + 10^{\frac{PL_i - PL(d_0)}{5u}}\right) \qquad (9)$$

$FA_{i,i-1}$=Floor loss between the $i^{th}$ floor and the $(i-1)^{th}$ floor
$P_{i-1}$=Strength of a signal transmitted from the $(i-1)^{th}$ floor to the user terminal
$PL(d_0)$=Power loss at the reference distance $d_0$ (for example, 1 m)
$u$=Path loss exponent
$H$=Vertical distance between APs installed in each floor
$PL_i$=Power loss in the $i^{th}$ floor The indoor wireless positioning apparatus 200 may obtain a Euclidean distance value using floor attenuation information ($FA_{i,i+1}$ and $FA_{i,i-1}$) extracted by the above-described equations and previous floor attenuation information pre-stored in the database 300, and identify a floor number in which the user terminal 10 is located through the result.

$$MEDM = \sqrt{(FA_{i,i-1} - PFA_{i,i-1})^2 + (FA_{i,i+1} - PFA_{i,i+1})^2} \qquad (10)$$

MEDM=Minimum Euclidean distance matching
$FA_{i,i-1}$=Floor loss between the $i^{th}$ floor and the $(i-1)^{th}$ floor
$FA_{i,i+1}$=Floor loss between the $i^{th}$ floor and the $(i+1)^{th}$ floor
$PFA_{i,i-1}$=Pre-stored floor loss between the $i^{th}$ floor and the $(i-1)^{th}$ floor
$PFA_{i,i+1}$=Pre-stored floor loss between the $i^{th}$ floor and the $(i+1)^{th}$ floor When $FA_{i,i-1}$ and $FA_{i,i+1}$ are calculated by Equations (8) and (9), the indoor wireless positioning apparatus 200 obtains an MEDM value using the pre-stored previous floor attenuations $PFA_{i,i-1}$ and $PFA_{i,i+1}$, and determines a value i corresponding to the MEDM value as a number of a floor on which the user terminal 10 is located.

For example, it is assumed that previous floor attenuation information in second, third, and fourth floors are stored in the database 300. In this case, because MEDM in the second floor is calculated to be 2.87 and MEDM in the fourth floor is calculated to be 0.89 when $FA_{i,i-1}$ is calculated to be 17.9 dB and $FA_{i,i+1}$ is calculated to be 17.3 dB as shown in Table 1, the floor on which the user terminal 10 is located is determined to be the fourth floor according to the MEDM (a minimum Euclidean distance value is found).

TABLE 1

| Estimated Value | Floor Number | | |
|---|---|---|---|
| | 2 | 4 | i |
| $FA_{i,i-1}$ | $PFA_{2,1}$ = 15.4 dB | $PFA_{4,3}$ = 18.7 dB | $FA_{i,i-1}$ = 17.9 dB |
| $FA_{i,i+1}$ | $PFA_{2,3}$ = 18.7 dB | $PFA_{4,5}$ = 16.9 dB | $FA_{i,i+1}$ = 17.3 dB |
| MEDM | 2.87 | 0.89 | i = 4 |

When the number of the floor on which the user terminal 10 is located is identified by the above-described method, the indoor wireless positioning apparatus 200 identifies a position on the horizontal plane in the floor number according to the following method.

Figure 3A:
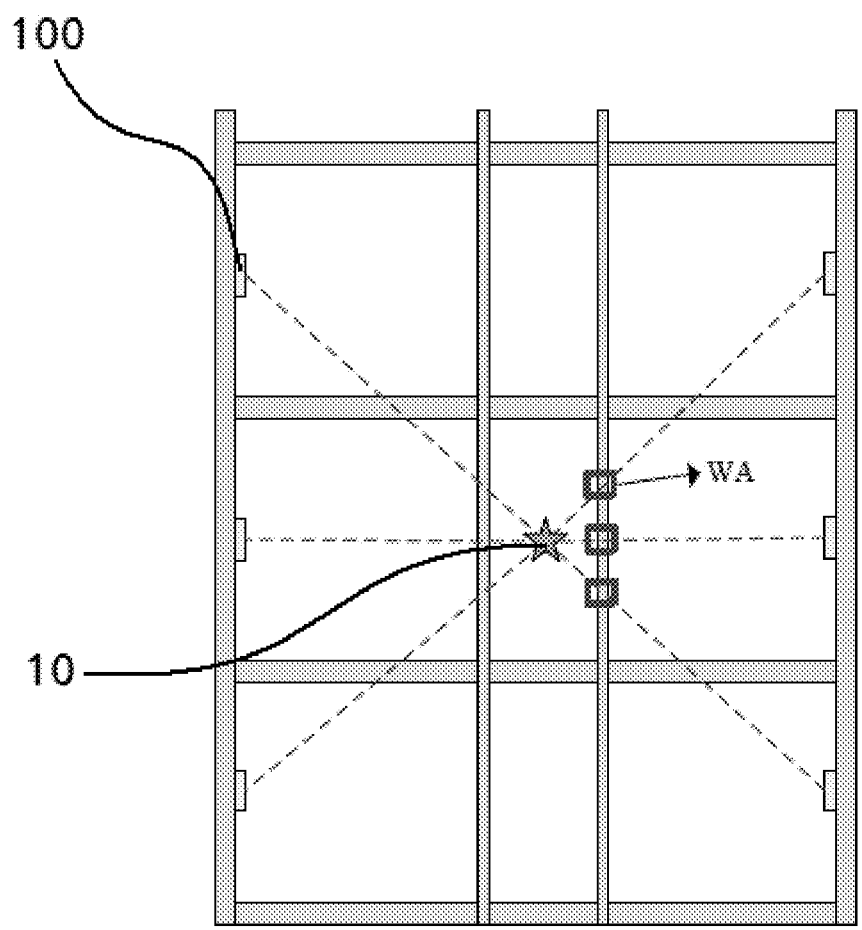
FIG. 3A is a cross-sectional view of a building illustrating a method of estimating a position of the user terminal on a horizontal plane in the indoor wireless positioning system according to the embodiment of the present invention.
Figure 3B:
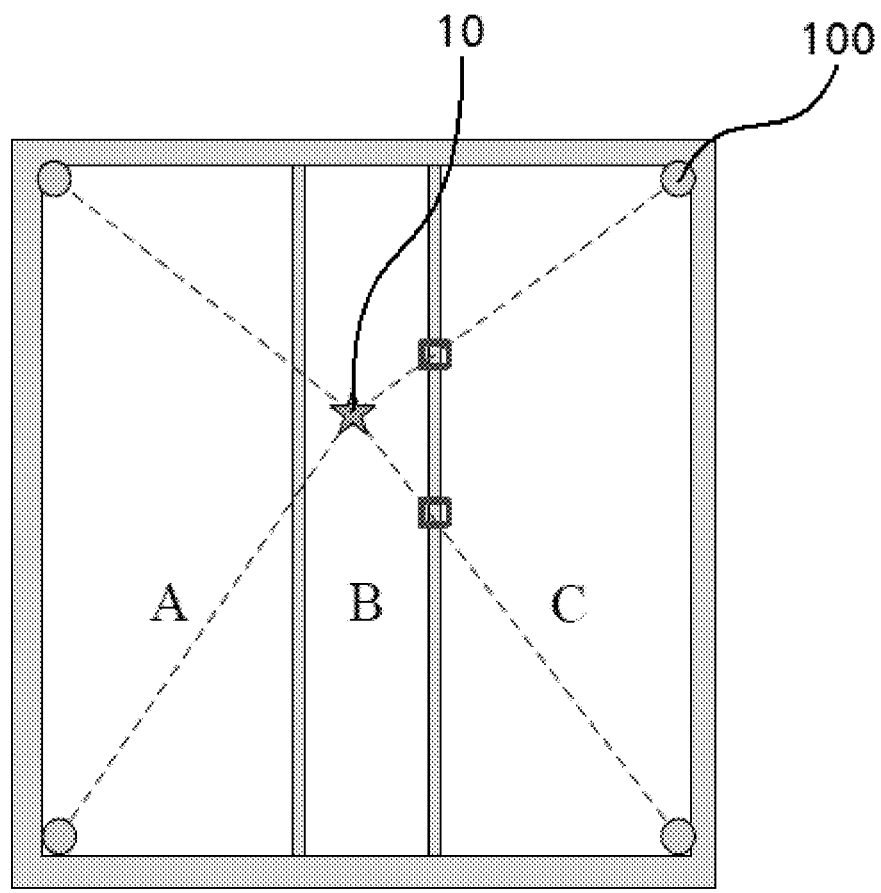
FIG. 3B is an upper cross-sectional view of one floor in the cross-sectional view of FIG. 3A.

FIG. 3A is a cross-sectional view of a building illustrating a method of estimating a position of the user terminal on the horizontal plane in the indoor wireless positioning system according to the embodiment of the present invention, and FIG. 3B is an upper cross-sectional view of one floor in the cross-sectional view of FIG. 3A.

When floors of the building are constructed by equivalent construction structures and the walls in the floors have the same distribution, wall attenuation, which is lost signal strength, becomes the same every time a transmission signal output from the AP 100 passes through the wall in the same floor. That is, when the signal passes through the wall, a degree of signal loss is the same. When wall attenuation is denoted by WA and $WA_j$ denotes propagation wall attenuation in a $j^{th}$ group, the following equation is obtained. Here, the $j^{th}$ group may be a vertical group of APs located on the vertical plane among APs installed in many floors (see the vertical group in FIG. 2B).

A distance function considering the wall attenuation is investigated through the following equation.

$$d_i = 10^{\frac{PL_i - PL(d_0) - WA_j}{10u}} \tag{11}$$

$d_i$=Distance between an AP located on an $i^{th}$ floor and a user terminal
$PL_i$=Power loss in the $i^{th}$ floor
$PL(d_0)$=Power loss at the reference distance $d_0$ (for example, 1 m)
u=Path loss exponent
$WA_j$=Wall loss in the $j^{th}$ group Equation (11) is an equation for a distance between the AP located on the $i^{th}$ floor and the user terminal 10 located on the $i^{th}$ floor.

$$d_{i+1} = 10^{\frac{PL_{i+1} - FA_{i+1} - PL(d_0) - WA_j - PL(d_0)}{10u}} \tag{12}$$

$d_{i+1}$=Distance between an AP located on an $(i+1)^{th}$ floor and a user terminal located on the $i^{th}$ floor
$PL_{i+1}$=Power loss in the $(i+1)^{th}$ floor
$PL(d_0)$=Power loss at reference distance $d_0$ (for example, 1 m)
u=Path loss exponent
$WA_j$=Wall loss in the $j^{th}$ group
$FA_{i+1}$=Floor loss in the $(i+1)^{th}$ floor Equation (12) is an equation for a distance between the AP located on the $(i+1)^{th}$ floor and the user terminal 10 located on the $i^{th}$ floor.

$$d_{i-1} = 10^{\frac{PL_{i-1} - FA_{i-1} - PL(d_0) - WA_j - PL(d_0)}{10u}} \tag{13}$$

$d_{i-1}$=Distance between an AP located on an $(i-1)^{th}$ floor and a user terminal located on the $i^{th}$ floor
$PL_{i-1}$=Power loss in the $(i-1)^{th}$ floor
$PL(d_0)$=Power loss at reference distance $d_0$ (for example, 1 m)
u=Path loss exponent
$WA_j$=Wall loss in the $j^{th}$ group
$FA_{i-1}$=Floor loss in the $(i-1)^{th}$ floor Equation (13) is an equation for a distance between the AP located on the $(i-1)^{th}$ floor and the user terminal 10 located on the $i^{th}$ floor.

The following Equation (14) is derived when the same geometric method as in Equations (7), (8), and (9) is used with the above-described Equations (11) to (13).

$$WA_j = -5u \log_{10} \left( \frac{H^2}{10^{\left(\frac{PL_{i+1/i-1} - FA_{i,i+1/i-1} + PL(d_0)}{5u}\right)} - 10^{\left(\frac{PL_{i,j} - PL(d_0)}{5u}\right)}} \right) \tag{14}$$

$WA_j$=Wall loss in the $j^{th}$ group
u=Path loss exponent
H=Vertical distance between APs installed in each floor
$PL_{i+1}$=Power loss in the $(i+1)^{th}$ floor
$FA_{i,i+1}$=Floor loss between the $i^{th}$ floor and the $(i+1)^{th}$ floor
$PL(d_0)$=Power loss at reference distance $d_0$ (for example, 1 m)
$PL_{i,j}$=RSS measured from the AP of the $i^{th}$ floor in the $j^{th}$ vertical group Equation 14 denotes wall attenuation of the $j^{th}$ group, and also reflects information about the floor loss ($FA_{i,i+1}$ and $FA_{i,i-1}$) occurring during signal propagation in another floor (a high floor or a lower floor). In Equation (14), '/' is a concept of 'OR' and any one value of 'i+1' or 'i−1' is selectively input. Here, the $j^{th}$ group represents a group of APs arranged on the same vertical plane as the other floors within the building. For the wall loss of the $j^{th}$ group, both concepts of wall loss occurring in the $i^{th}$ floor for a signal transmitted down from a higher floor (i+1) reflecting floor loss ($FA_{i,i+1}$) and wall loss of a signal transmitted up from a lower floor (i−1) reflecting floor loss ($FA_{i,i-1}$) are applied to Equation (14).

The indoor wireless positioning apparatus 200 may receive information about strengths (RSSs) of signals transmitted from a plurality of APs (at least three APs) arranged on the same floor to the user terminal 10, and calculate a position of the user terminal 10 using technology such as the well-known triangulation method in consideration of an influence due to wall loss (WA) calculated by the above Equation (14) with the RSSs.

Specifically, the indoor wireless positioning apparatus 200 may acquire distance information using RSS information of signals received by the user terminal 10 after the signals are transmitted from the at least three APs 100 internally installed on the same floor, calculate position data by the triangulation method using the acquired distance information, and acquire distance information in a free space in consideration of wall loss when the RSS information. Hereinafter, for example, this will be specifically described with reference to the drawings.

Figure 4:
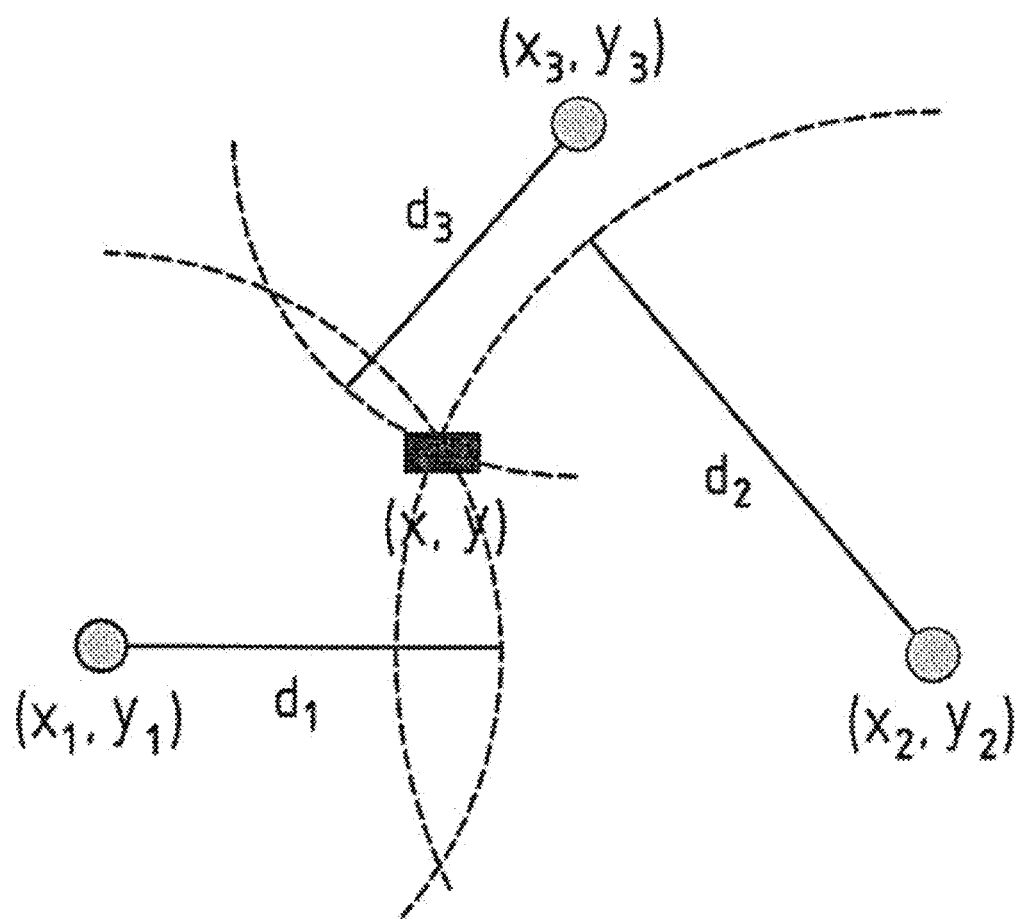
FIG. 4 is a conceptual diagram illustrating a method of finding position coordinates of the user terminal on the horizontal plane in the indoor wireless positioning system according to the embodiment of the present invention.

Referring to FIG. 4, it is assumed that a position of the user terminal 10, which moves inside a space, is set as a space, (x, y), three APs 100 are AP1, AP2, and AP3, coordinates of the APs are $(x_1, y_1)$, $(x_2, y_2)$, and $(x_3, y_3)$. In addition, it is assumed that distances from the user terminal 10 to three distance points are $d_1$, $d_2$, and $d_3$.

Thus, the distances between the user terminal 10 and the reference points may be calculated by the Pythagoras theorem.

$$d_1^2 = (x - x_1)^2 + (y - y_1)^2 \tag{15}$$

$$d_2^2 = (x - x_2)^2 + (y - y_2)^2 \tag{16}$$

$$d_3^2 = (x - x_3)^2 + (y - y_3)^2 \tag{17}$$

Here, $d_1$, $d_2$, and $d_3$ may be obtained in various schemes. Here, these may be obtained using the RSS of the user terminal 10. The indoor wireless positioning apparatus 200 may obtain a distance between the user terminal 10 and the AP 100 through a Friis formula (propagation attenuation prediction formula).

$$L = 20\log_{10}\left(\frac{4\pi d}{\lambda}\right)[\text{dB}] \quad (18)$$

L=Signal attenuation
λ=Propagation length
d=Distance

Equation (18) is the formula representing the relationship between the signal attenuation and the distance. When the loss (that is, attenuation) of the RSS received by the user terminal 10 is calculated, the indoor wireless positioning apparatus 200 reflects wall attenuation calculated by Equation (14). The indoor wireless positioning apparatus 200 may calculate the position of the user terminal 10 in a free space environment without a wall by subtracting attenuation due to the wall, that is, a wall attenuation amount, from an attenuation amount of the signal strength received by the user terminal 10. When Equation (18) is arranged for a distance d between two points, the distance d is defined as shown in Equation (19).

$$d = \frac{\lambda}{4\pi}10^{\frac{L}{20}} = \frac{c}{4\pi f}10^{\frac{L}{20}} \quad (19)$$

L=Signal attenuation
c=Propagation speed
f=frequency
λ=Propagation length
d=Distance For example, when the loss of a signal transmitted from the AP 100 to the user terminal 10 is 80 dB, a propagation speed of a radio signal in air is 3×10⁸ [m/sec], and the wall loss is 20 dB in a wireless LAN-based position tracking system using a band of 2.4 GHz, the distance d between two points is as follows.

$$d = \frac{3\times 10^8}{4\times 3.14\times 2.4\times 10^9} \cdot 10^{\frac{80-20}{20}} \cong 0.01\times 1000 = 10[\text{m}]$$

Ultimately, the indoor wireless positioning apparatus 200 identifies a floor on which the user terminal 10 is located through MEDM, calculates a distance between the user terminal 10 and the AP 100 by reflecting wall attenuation in the strength of a signal received by the user terminal 10 on the identified floor, and calculates coordinates on the horizontal plane of the user terminal 10 using the calculated distance.

Figure 5:
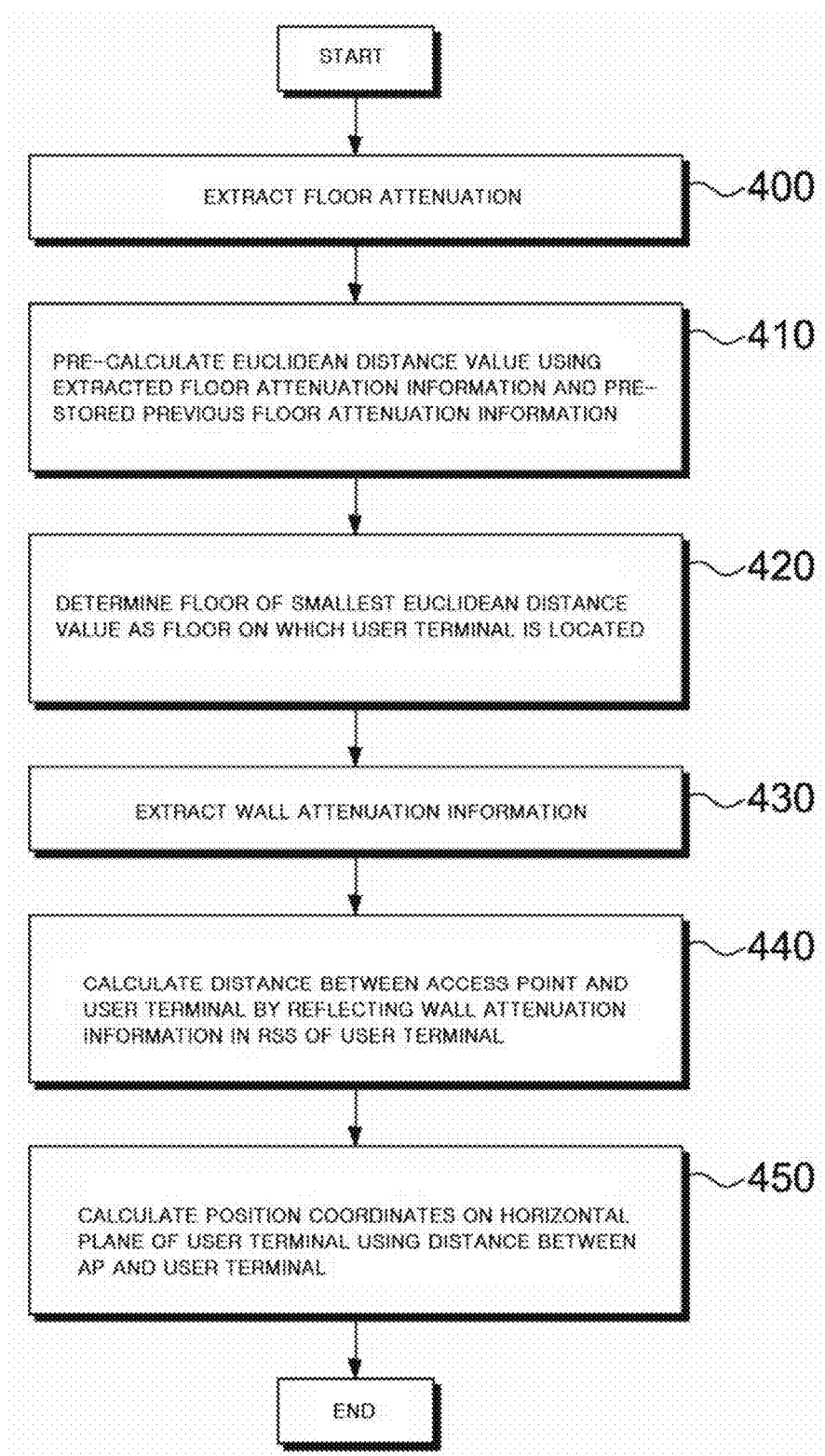
FIG. 5 is a control flowchart illustrating an indoor wireless positioning method according to an embodiment of the present invention.

FIG. 5 is a control flowchart illustrating an indoor wireless positioning method according to an embodiment of the present invention.

The indoor wireless positioning system extracts floor attenuation information. The indoor wireless positioning system calculates MEDM using the extracted floor attenuation information and previous floor attenuation information pre-stored in the database 300. The MEDM is calculated by obtaining Euclidean distance values of the extracted floor attenuation information and the previous floor attenuation information and obtaining a minimum value. A floor on which the Euclidean distance value is minimized is determined to be a floor on which the user terminal 10 is located (400, 410, and 420).

The indoor wireless positioning system extracts wall attenuation information. The indoor wireless positioning system obtains distances between a plurality of APs 100 and the user terminal 10 by combining the extracted wall attenuation information and the RSS information of the user terminal 10 (430 and 440).

The indoor wireless positioning system may calculate position coordinates of the user terminal 10 using distances between the plurality of APs 100 and the user terminal 10 within the small horizontal plane. In this case, a triangulation method, for example, may be applied (450).

As described above, according to an aspect of the present invention, it is possible to improve detection accuracy and perform more efficient wireless positioning because both inter-floor attenuation and inter-wall attenuation of signals are considered when a position of a user terminal, which moves within a building, is detected.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for finding an indoor position of a user terminal, the method comprising:
    calculating, by a processor, a first signal loss data received from an (i−1)-th floor and a second signal loss data received from an (i+1)-th floor, wherein the user terminal is located in an i-th floor;
    comparing the first signal loss data and the second signal loss data to a pre-stored signal loss data;
    identifying the i-th floor on which the user terminal is located based on a calculation of the first signal loss data and the second signal loss data using a mathematical model;
    calculating a wall signal loss data on the i-th floor and a received signal strength (RSS);
    identifying the indoor position on the i-th floor; and
    tracking, by the processor, the indoor position of the user terminal as the user terminal moves inside a building of a plurality of floors.

2. The method of claim 1, wherein the calculating the first signal loss data and the second signal loss data further comprises
    calculating the first signal loss data and the second signal loss data according to RSSs transmitted from the (i−1)-th floor and (i+1)-th floor, respectively, a reference power loss data at a reference distance, and an i-th floor power loss data on the i-th floor.

3. The method of claim 1, wherein the identifying the i-th floor further comprises
    calculating a Minimum Euclidean Distance Matching (MEDM) value according to the following equation:

$$\text{MEDM}=\sqrt{(\text{FA}_{i,i-1}-\text{PFA}_{f,f-1})^2+(\text{FA}_{i,i+1}-\text{PFA}_{f,f+1})^2},$$

wherein $\text{FA}_{i,i-1}$ denotes the first signal loss data between the i-th floor and the (i−1)-th floor, $\text{FA}_{i,i+1}$ denotes the second signal loss data between the i-th floor and the (i+1)-th floor, $\text{PFA}_{f,f-1}$ denotes a (f−1)th pre-stored signal loss data between a f-th floor and (f−1)th-floor, $\text{PFA}_{f,f+1}$ denotes a pre-stored signal loss data at a (f+1)th-floor; and
    identifying the floor number f which minimizes the MEDM value and determining the i-th floor number which is equal to the floor number f.

4. The method of claim 1, wherein the identifying the indoor position further comprises calculating the indoor position of the user terminal in a free space without a wall by calculating an attenuation value of the RSS transmitted to the user terminal and subtracting an attenuation value due to the wall signal loss data from the attenuation value of the RSS, wherein the wall signal loss data ($WA_j$) is obtained according to the following equation:

$$WA_j = -5u\log_{10}\left(\frac{H^2}{10\left(\frac{PL_{i+1/i-1} - FA_{i,i+1/i-1} + PL(d_0)}{5u}\right) - 10\left(\frac{PL_{i,j} - PL(d_0)}{5u}\right)}\right),$$

wherein $WA_j$ denotes the wall signal loss data, u denotes a path loss exponent, H denotes a vertical distance between Aps installed in each floor, $PL_{i+1}$ denotes a power loss data in the (i+1)th floor, $FA_{i,i+1}$ denotes a floor loss data between the i-th floor and the (i+1)th-floor, $PL(d_0)$ denotes the reference power loss data at reference distance $d_0$, $PL_{i,j}$ denotes the RSS measured from the AP of the i-th floor in a j-th vertical group, and i+1/i−1 denotes i+1 or i−1.

5. The method of claim 4,
wherein distances from a plurality of access points (APs) transmitting signals to the user terminal in the free space without the wall are calculated, and
wherein position coordinates of the user terminal are calculated using a triangulation technique for the calculated distances.

6. A system for tracking an indoor position of a user terminal the system comprising:
at least one AP installed for each floor and transmitting a signal within a building:
a database unit storing a plurality of signal loss data for each floor of the building; and
an indoor wireless positioning apparatus calculating a first signal loss data received from an (i−1)-th floor and a second signal loss data received from an (i+1)-th floor, wherein the user terminal is located in an i-th floor; to compare the first signal loss data and the second signal loss data to the plurality of signal loss data, to identify the i-th floor based on a calculation of the first signal loss data and the second signal loss data using a mathematical model, and to identify the indoor position on the i-th floor by calculating a wall signal loss data on the i-th floor and a received signal strength (RSS).

7. The system of claim 6, wherein the at least one AP further comprises at least one vertical group in which the at least one AP is installed on the same vertical plane and at least one horizontal group in which the at least one AP has the same horizontal coordinates for each floor.

8. The system of claim 6, wherein the indoor wireless positioning apparatus calculates the first signal loss data and the second signal loss data according to RSSs transmitted from the (i-1)-th floor and (i+1)-th floor, respectively, a reference power loss data at a reference distance, and an i-th floor power loss data on the i-th floor.

9. The system of claim 6, wherein the indoor wireless positioning apparatus further comprises a processor identifying the i-th floor by calculating a Minimum Euclidean Distance Matching (MEDM) value according to the following equation:

$$MEDM = \sqrt{(FA_{i,i-1} - PFA_{f,f-1})^2 + (FA_{i,i+1} - PFA_{f,f+1})^2},$$

wherein $FA_{i,i+1}$ denotes the first signal loss data between the i-th floor and the (i−1)-th floor, $FA_{i,i+1}$ denotes the second signal loss data between the i-th floor and the (i+1)-th floor, $PFA_{f,f-1}$ denotes a (f−1)th pre-stored signal loss data between a f-th floor and (f−1)th-floor, $PFA_{f,f+1}$ denotes a pre-stored signal loss data at a (f+1)th-floor; and wherein the floor number f which minimizes the MEDM value is set to be equal to the i-th floor number.

10. The system of claim 6, wherein the indoor wireless positioning apparatus further comprises a processor identifying the indoor position on the horizontal plane of the user terminal according to the RSS of the user terminal and the information about the wall signal loss data to calculate the indoor position of the user terminal in a free space without a wall by calculating an attenuation value of the RSS transmitted to the user terminal and subtracting the attenuation value due to the wall signal loss data from the attenuation value of the RSS, wherein the wall signal loss data ($WA_j$) is obtained according to the following equation:

$$WA_j = -5u\log_{10}\left(\frac{H^2}{10\left(\frac{PL_{i+1/i-1} - FA_{i,i+1/i-1} + PL(d_0)}{5u}\right) - 10\left(\frac{PL_{i,j} - PL(d_0)}{5u}\right)}\right),$$

wherein $WA_1$ denotes the wall signal loss data, u denotes a path loss exponent, H denotes a vertical distance between Aps installed in each floor, $PL_{i,i+1}$ denotes a power loss data in the (i+1)th floor, $FA_{i,i+1}$ denotes a floor loss data between the i-th floor and the (i+1)th-floor, $PL(d_0)$ denotes the reference power loss data at reference distance $d_0$, $PL_{i,j}$ denotes the RSS measured from the AP of the i-th floor in a j-th vertical group, and i+1/i−1 denotes i+1 or i−1.

11. A method for tracking an indoor position of a user terminal, the method comprising:
calculating a first signal loss data received from an (i−1)-th floor and a second signal loss data received from an (i+1)-th floor, wherein the user terminal is located in an i-th floor and the calculating the first signal loss data and the second signal loss data is obtained according to received signal strengths (RSSs) transmitted from the (i−1)-th floor and (i+1)-th floor, respectively, a reference power loss data at a reference distance, and an i-th floor power loss data on the i-th floor;
comparing the first signal loss data and the second signal loss data to a pre-stored signal loss data;
identifying the i-th floor on which the user terminal is located based on a calculation of the first signal loss data and the second signal loss data using a mathematical model;
wherein the identifying the i-th floor is obtained:
by calculating a Minimum Euclidean Distance Matching (MEDM) value according to the following equation:

$$MEDM = \sqrt{(FA_{i,i-1} - PFA_{f,f-1})^2 + (FA_{i,i+1} - PFA_{f,f+1})^2},$$

wherein $FA_{i,i-1}$ denotes the first signal loss data between the i-th floor and the (i−1)-th floor, $FA_{i,i+1}$ denotes the second signal loss data between the i-th floor and the (i+1)-th floor, $PFA_{f,f-}1$ denotes a (f−1)th pre-stored signal loss data between a f-th floor and (f−1)th-floor, $PFA_{f,f+}1$ denotes a pre-stored signal loss data at a (f+1)th-floor; and
by identifying the floor number f which minimizes the MEDM value and determining the i-th floor number which is equal to the floor number f;
calculating a wall signal loss data on the i-th floor and a received signal strength (RSS);

identifying the indoor position on the i-th floor, wherein the identifying the indoor position is obtained by calculating the indoor position of the user terminal in a free space without a wall by calculating an attenuation value of the RSS transmitted to the user terminal and subtracting an attenuation value due to the wall signal loss data from the attenuation value of the RSS; and tracking the indoor position of the user terminal as the user terminal moves inside a building of a plurality of floors, wherein the wall signal loss data ($WA_j$) is obtained according to the following equation:

$$WA_j = -5u\log_{10}\left(\frac{H^2}{10\left(\frac{PL_{i+1/i-1} - FA_{i,i+1/i-1} + PL(d_0)}{5u}\right) - 10\left(\frac{PL_{i,j} - PL(d_0)}{5u}\right)}\right),$$

wherein $WA_j$ denotes the wall signal loss data, u denotes a path loss exponent, H denotes a vertical distance between Aps installed in each floor, $PL_{i+1}$ denotes a power loss data in the (i+1)th floor, $FA_{i,i+1}$ denotes a floor loss data between the i-th floor and the (i+1)th-floor, $PL(d_0)$ denotes the reference power loss data at reference distance $d_0$, $PL_{i,j}$ denotes the RSS measured from the AP of the i-th floor in a j-th vertical group, and i+1/i−1 denotes i+1 or i−1.

\* \* \* \* \*